(12) United States Patent
Zhang et al.

(10) Patent No.: US 11,347,792 B2
(45) Date of Patent: May 31, 2022

(54) VIDEO ABSTRACT GENERATING METHOD, APPARATUS, AND STORAGE MEDIUM

(71) Applicant: TENCENT TECHNOLOGY (SHENZHEN) COMPANY LIMITED, Guangdong (CN)

(72) Inventors: Hao Zhang, Shenzhen (CN); Xiang Qi Huang, Shenzhen (CN); Yong Jun Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 28 days.

(21) Appl. No.: 17/016,638

(22) Filed: Sep. 10, 2020

(65) Prior Publication Data

US 2020/0409996 A1 Dec. 31, 2020

Related U.S. Application Data

(63) Continuation of application No. PCT/CN2019/100051, filed on Aug. 9, 2019.

(30) Foreign Application Priority Data

Aug. 21, 2018 (CN) .......................... 201810955587.X

(51) Int. Cl.
*G06F 16/738* (2019.01)
*G06F 16/75* (2019.01)
(Continued)

(52) U.S. Cl.
CPC ............. *G06F 16/739* (2019.01); *G06F 16/75* (2019.01); *G06F 16/785* (2019.01); *G06N 3/08* (2013.01);
(Continued)

(58) Field of Classification Search
CPC ...... G06F 16/739; G06F 16/75; G06F 16/785; G06F 17/30843; G06K 9/00744;
(Continued)

(56) References Cited

U.S. PATENT DOCUMENTS

2007/0171303 A1* 7/2007 Barbieri ............. H04N 21/4532
348/468
2012/0173577 A1* 7/2012 Millar ................. G06F 16/7837
707/780
(Continued)

FOREIGN PATENT DOCUMENTS

CN 101561932 A 10/2009
CN 103617234 A 3/2014
(Continued)

OTHER PUBLICATIONS

Kyprianidis et al., ("Image and Video Abstraction by Coherence-Enhancing Filtering" Published 2011—Eurographics—vol. 30 (2011), No. 2 pp. 593-602 (Year: 2011).*
(Continued)

*Primary Examiner* — Quoc A Tran
(74) *Attorney, Agent, or Firm* — Sughrue Mion, PLLC

(57) ABSTRACT

A video abstract generation method is provided. The method includes obtaining a target searching condition; searching a video database for structured image data meeting the target searching condition, the structured image data being stored in the video database in a structured data format; and performing video synthesis on the structured image data meeting the target searching condition, to generate a video abstract.

20 Claims, 8 Drawing Sheets

(51) Int. Cl.
| | |
|---|---|
| *G06F 16/783* | (2019.01) |
| *G06N 3/08* | (2006.01) |
| *G06V 20/40* | (2022.01) |
| *H04N 21/8549* | (2011.01) |
| *G06K 9/62* | (2022.01) |
| *G06N 7/00* | (2006.01) |
| *G06F 17/00* | (2019.01) |

(52) U.S. Cl.
CPC ........... *G06V 20/46* (2022.01); *G06K 9/6221* (2013.01); *G06N 7/005* (2013.01); *H04N 21/8549* (2013.01)

(58) Field of Classification Search
CPC .... G06K 9/6221; G06K 9/00751; G06N 3/08; G06N 7/005; H04N 21/8549
See application file for complete search history.

(56) References Cited

U.S. PATENT DOCUMENTS

| | | |
|---|---|---|
| 2015/0104149 A1 | 4/2015 | Sim et al. |
| 2018/0254064 A1* | 9/2018 | Gonzalez-Banos ........................ G06F 16/7867 |

FOREIGN PATENT DOCUMENTS

| | | |
|---|---|---|
| CN | 104754248 A | 7/2015 |
| CN | 106354816 A | 1/2017 |
| CN | 106937120 A | 7/2017 |
| CN | 107291910 A | 10/2017 |

OTHER PUBLICATIONS

Li et al., ("An Overview of Video Abstraction Techniques" Published Jul. 31, 2001—Imaging Systems Laboratory HP Laboratories Palo Alto—24 Pages (Year: 2001).*

Written Opinion of the International Searching Authority dated Oct. 29, 2019 in International English Application No. PCT/CN2019/100051.

Extended European Search Report dated Sep. 10, 2021 from the European Patent Office in EP Application No. 19852152.8.

Communication dated Sep. 28, 2021 from the European Patent Office in EP Application No. 19852152.8.

Martin et al., "Dynamic Video Abstract Generation Using an Object DBMS", Multimedia and Expo, 2000. ICME 2000. 2000 IEEE International Conference on New York, NY, USA Jul. 30-Aug. 2, 2000, Piscataway, NJ, USA, IEEE, US, vol. 3, Jul. 30, 2000, pp. 1523-1526, XP010512795, DOI: 10.1109/ICME.2000.871057, ISBN: 978-0-7803-6536-0 (4 pages total).

International Search Report for PCT/CN2019/100051, dated Oct. 29, 2019.

* cited by examiner

VIDEO ABSTRACT GENERATING METHOD, APPARATUS, AND STORAGE MEDIUM

CROSS-REFERENCE TO RELATED APPLICATION(S)

This application is a bypass continuation application of International Application No. PCT/CN2019/100051, filed Aug. 9, 2019, which claims priority to Chinese Patent Application No. 201810955587.X, entitled "VIDEO ABSTRACT GENERATION METHOD AND APPARATUS, AND STORAGE MEDIUM" and filed with the National Intellectual Property Administration, PRC on Aug. 21, 2018, the disclosures of which are herein incorporated by reference in their entireties.

FIELD

The disclosure relates to the field of communications technologies, and in particular, to a video abstract generation method and apparatus, a computing device, and a storage medium.

BACKGROUND

A video abstract is a technology that can summarize main content of an original video. With the ever-growing requirements for video data processing and the increasing video data volumes, users need to create an abstract for a long video to allow for quick browsing of the video. Through a video abstract technology, a user may make full use of not only text, but also audio and video information in content-based video retrieval. The video abstract technology aims to effectively represent and quickly access video data, and reduce costs of video storage, classification, and indexing by using analysis for video content, to improve use efficiency, availability, and accessibility of a video. Thus, the video abstract technology is based on the development of content-based video analysis technologies.

SUMMARY

According to an aspect of an example embodiment, there is provided a video abstract generation method, performed by a server device, the method including:
obtaining a target searching condition;
searching a video database for structured image data meeting the target searching condition, the structured image data being stored in the video database in a structured data format; and
performing video synthesis on the structured image data meeting the target searching condition, to generate a video abstract.

According to an aspect of an example embodiment, there is provided a video abstract generation apparatus, including:
at least one memory configured to store program code; and
at least one processor configured to read the program code and operate as instructed by the program code, the program code including:
first obtaining code configured to cause at least one of the at least one processor to obtain a target searching condition;
search code configured to cause at least one of the at least one processor to search a video database for structured image data meeting the target searching condition, the structured image data being stored in the video database in a structured data format; and
generation code configured to cause at least one of the at least one processor to perform video synthesis on the structured image data meeting the target searching condition, to generate a video abstract.

According to an aspect of an example embodiment, there is provided a non-transitory storage medium, storing a plurality of instructions, the plurality of instructions executable by a processor to cause the processor to perform:
obtaining a target searching condition;
searching a video database for structured image data meeting the target searching condition, the structured image data being stored in the video database in a structured data format; and
performing video synthesis on the structured image data meeting the target searching condition, to generate a video abstract.

According to an aspect of an example embodiment, there is provided a computing device, comprising a processor, and a memory configured to store instructions executable by the processor, to cause the processor to perform the foregoing video abstract generation method.

BRIEF DESCRIPTION OF THE DRAWINGS

To describe the technical solutions in the example embodiments of the disclosure more clearly, the following briefly describes the accompanying drawings required for describing the embodiments. Apparently, the accompanying drawings in the following description show merely some embodiments of the disclosure, and a person skilled in the art may still derive other drawings from these accompanying drawings without creative efforts.

DETAILED DESCRIPTION

Figure 1:
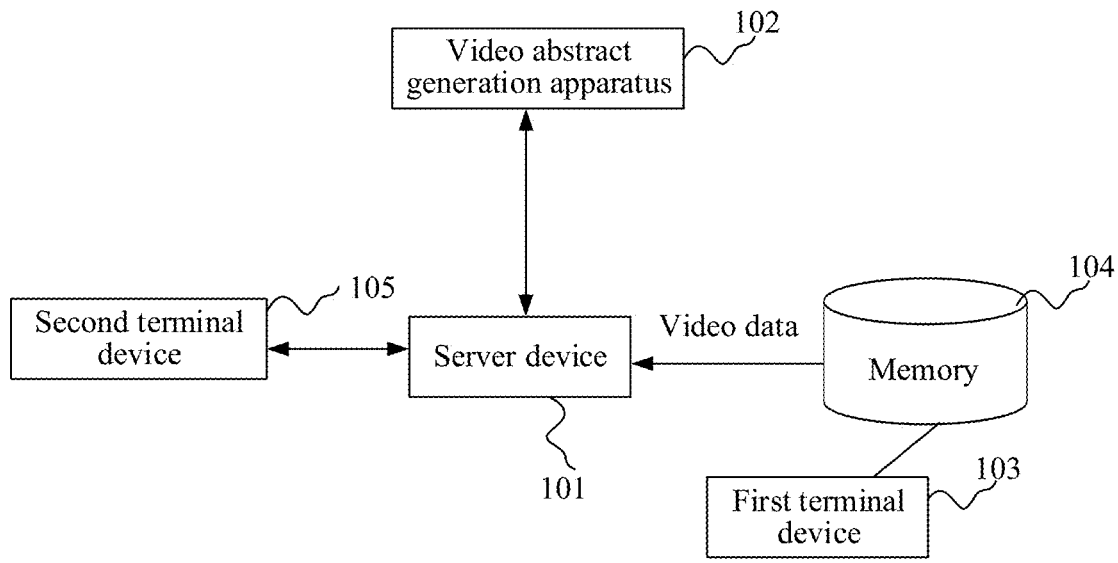
FIG. 1 is a schematic diagram of an embodiment of a video abstract generation system according to an embodiment of the disclosure.

The following clearly and completely describes the technical solutions in the embodiments of the disclosure with reference to the accompanying drawings in the embodiments of the disclosure. Apparently, the described embodiments are some of the embodiments of the disclosure rather than all of the embodiments. All other embodiments obtained by a person skilled in the art based on the embodiments of the disclosure without creative efforts shall fall within the protection scope of the disclosure.

In the following descriptions, the specific embodiments of the disclosure are described with reference to steps of operations performed by one or more computers and symbols, unless otherwise defined. Therefore, such steps and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the principle of the disclosure is being described in the foregoing text, it is not meant to be limiting as a person skilled in the art will appreciate that the various steps and operations described hereinafter may be implemented in hardware.

A term "module" used in the specification may be considered as a software object executed in the calculation system. Different components, modules, engines, and services described in the specification may be considered as objects implemented in the calculation system. In some embodiments, the apparatus and method described in the specification is implemented in a form of software, and certainly can be implemented in a form of hardware, both of which fall within the protection scope of the disclosure.

A video abstract is a technology that can summarize main content of an original video. With the ever-growing requirements for video data processing and the increasing video data volumes, users need to create an abstract for a long video to allow for quick browsing of the video. Through a video abstract technology, users may make full use of not only text, but also audio and video information in content-based video retrieval. The function of the video abstract is mainly to facilitate storage and video browsing or search, and because the length of the video abstract is much shorter than that of original video data, storage time and space are saved. Also, browsing or searching the video abstract is faster compared with browsing the original video while the main points of original content are reserved in the video abstract.

In the related art, processing on video content is relatively simple, and no data structured processing is performed on the video content. Consequently, rapid screening and retrieval of the video content cannot be implemented, and a usage scenario and an application scenario of the video content are relatively limited.

Embodiments of the disclosure provide a video abstract generation method and apparatus, a computing device, and a storage medium.

FIG. 1 is a schematic diagram of a video abstract generation system according to an embodiment of the disclosure. As shown in FIG. 1, the video abstract generation system includes a server device 101, and the server device 101 may be a server, or a server cluster formed by a plurality of servers, or a cloud computing service center.

In an embodiment of the disclosure, the video abstract generation system has a function of generating a video abstract. Specifically, the video abstract generation system may include a video abstract generation apparatus 102, the video abstract generation apparatus 102 may be specifically integrated in the server device 101, and the server device 101 is a server device in FIG. 1. The server device 101 is mainly configured to obtain a target screening condition (or target searching condition) for generating a video abstract, search a video database for structured image data according to the target screening condition, to obtain structured image data meeting the target screening condition, the structured image data being image data stored in a structured manner, and perform video synthesis on the structured image data meeting the target screening condition, to generate the video abstract.

The video abstract generation system may further include one or more first terminal devices 103, the first terminal device 103 may be used as an image acquisition device, for example, a camera or a personal computer (PC) having a camera, a notebook computer, a smartphone, a PAD, or a tablet computer, and the image acquisition device may acquire an image and convert the acquired image into a computer-readable form such as a video. Only one first terminal device 103 is shown in FIG. 1, and one or more first terminal devices 103 may be disposed according to requirements in actual application.

The video abstract generation system may further include a memory 104, configured to store a video database. The video database stores video data, the video data may be video data shot by the one or more first terminal devices 103, for example, surveillance video data shot by one or more surveillance cameras or other film and television video data, and the video data includes structured image data using a target tracking sequence as a unit, for a user to retrieve video content to generate a video abstract.

The video abstract generation system may further include a second terminal device 105, configured to display the video abstract that is generated by the server device 101 and that is received from the server device 101. The second terminal device 105 may be an intelligent terminal device such as a PC or a notebook computer, or an intelligent mobile terminal device such as a smartphone, a PAD, or a tablet computer.

The schematic scenario diagram of the video abstract generation system shown in FIG. 1 is merely an example. The video abstract generation system and the scenario described in the embodiments of the disclosure are intended to more clearly describe the technical solutions in the embodiments of the disclosure, and do not constitute a limitation on the technical solutions provided in the embodiments of the disclosure. A person of ordinary skill in the art would understand that, with evolution of the video abstract generation system and appearance of a new service scenario, the technical solutions provided in the embodiments of the disclosure also apply to a similar technical problem.

Detailed descriptions are provided below with reference to example embodiments.

In an embodiment, descriptions are provided from the perspective of a video abstract generation apparatus. The video abstract generation apparatus may be specifically integrated into a server device.

The disclosure provides a video abstract generation method. The method includes: obtaining a target screening condition for generating a video abstract, searching a video database for structured image data according to the target screening condition, to obtain structured image data meeting the target screening condition, the structured image data being image data stored in a structured manner, and performing video synthesis on the structured image data meeting the target screening condition, to generate the video abstract.

Figure 2A:
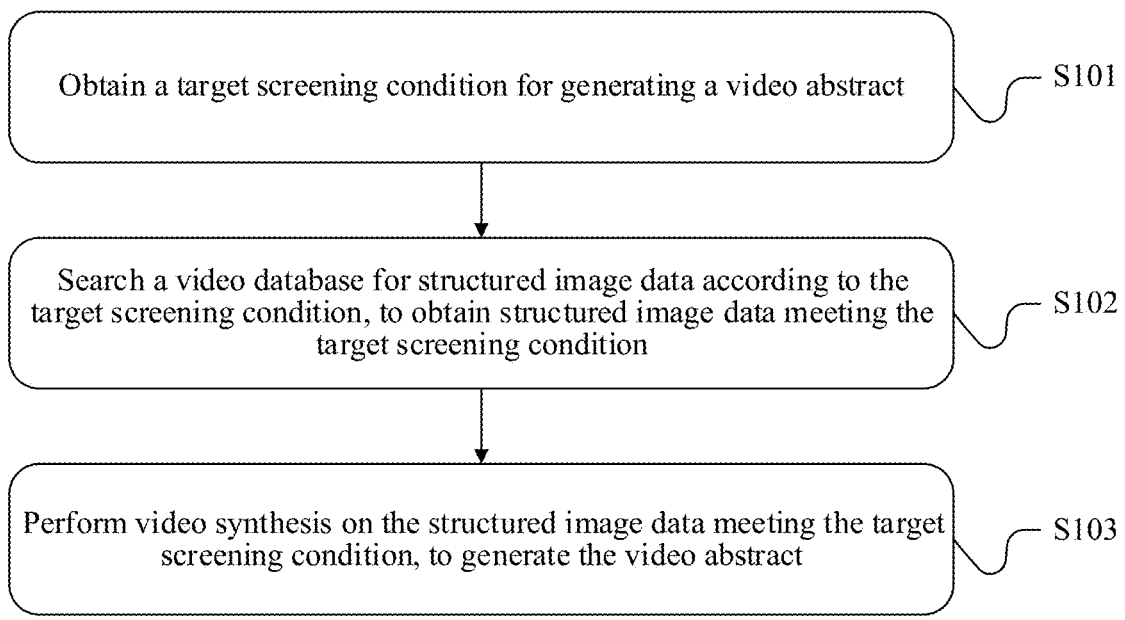
FIG. 2A is a schematic diagram of an embodiment of a video abstract generation method according to an embodiment of the disclosure.

In some embodiments, referring to FIG. 2A, the video abstract generation method in an embodiment of the disclosure is performed by a server device, and includes the following operations S101-S103.

S101. Obtain a target screening condition (or target searching condition) for generating a video abstract.

In an embodiment of the disclosure, when a user needs to perform video content screening (or searching) in a preset video database, the user may select a screening condition from preset screening options to obtain a target screening condition. The screening options may be specifically set according to an actual application requirement, for example, a color option (for example, red, black, or any color unlimited), an object class option (for example, a person or a vehicle, and specifically, a male or a female, or a car or a bicycle), and a target track direction option (for example, a target track direction is from south to north).

In some embodiments, if the user does not select from the screening options, the target screening condition is a default screening condition. For example, if the user does not select from the screening options, the screening options are selected by default.

After the user selects a screening condition from preset screening options or the screening option is selected by default, a target screening condition may be obtained. The target screening condition includes corresponding keywords selected from the screening options, the keywords may include one or more target keywords, for example, "red", "male", and "vehicle", indicating that image data having target attribute features such as red, male, and vehicle are to be searched for in a video database.

It would be understood that the target screening condition may further include some other setting conditions for generating a video abstract, and may be specifically set according to an actual application requirement. For example, the target screening condition includes a target synthesis density, and the target synthesis density represents a quantity of targets in each frame of image in the generated video abstract. In some embodiments of the disclosure, a high level, a medium level, and a low level of the target synthesis density may be further set, and each level corresponds to a level of a target synthesis density. For example, when the target synthesis density is at the low level, it indicates that there are three or less targets in each frame of image in the generated video abstract, when the target synthesis density is at the medium level, it indicates that there are targets equal to or greater than four and equal to or less than eight in each frame of image in the generated video abstract, and when the target synthesis density is at the high level, it indicates that there are nine or greater targets in each frame of image in the generated video abstract. In some embodiments, the target screening condition includes a screening time range, for example, Mar. 1, 2018 to Mar. 2, 2018, and certainly may further include information about hour, minute, or second.

In an embodiment of the disclosure, when the user selects to perform video content screening, the video abstract generation apparatus obtains the screening condition selected by the user from the screening options, to obtain the target screening condition.

S102. Search a video database for structured image data according to the target screening condition, to obtain structured image data meeting the target screening condition, the structured image data being image data stored in a structured manner.

Figure 2B:
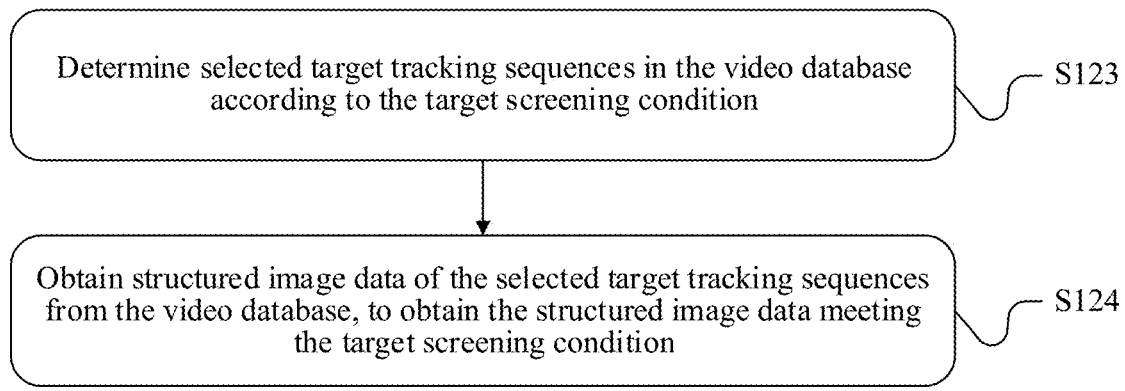
FIG. 2B is a flowchart of operation S102 according to an embodiment of the disclosure.

Specifically, the video database stores structured image data of a video image, for example, the video database stores structured image data using a target tracking sequence as a unit. In this case, FIG. 2B is a flowchart of operation S102 according to an embodiment of the disclosure. Referring to FIG. 2B, the searching a video database for structured image data according to the target screening condition, to obtain structured image data meeting the target screening condition may include the following operations.

S123. Determine selected target tracking sequences in the video database according to the target screening condition.

In some embodiments, as described above, the video database stores the structured image data using a target tracking sequence as a unit. The target tracking sequence is to track a target in a video to be processed. After tracking ends or a preset quantity of frames are tracked, the video to be processed includes a frame sequence of the tracked target.

In some embodiments, data of the target tracking sequence includes identification information of the target tracking sequence, attribute information of the target tracking sequence, and each foreground image in the target tracking sequence.

In some embodiments, the selected target tracking sequences are target tracking sequences having attribute information the same as that of a keyword in the target screening condition in the video database.

S124. Obtain structured image data of the selected target tracking sequences from the video database, to obtain the structured image data meeting the target screening condition.

In an embodiment of the disclosure, the video database stores the structured image data using a target tracking sequence as a unit, and structured data is also referred to as row data, is data that is logically expressed and implemented by using a two-dimensional table structure, strictly follows a data format and length specification, and is stored and managed mainly through a relational database. In an embodiment of the disclosure, image data is stored in a structured data format, that is, the structured image data.

Generally, to store video data of a particular source, a video database is set separately. The video data stored in the video database in an embodiment of the disclosure may be surveillance video data shot by one or more surveillance cameras, that is, the video database in an embodiment of the disclosure may be a surveillance video database such as a community surveillance video database, an intersection surveillance video database, a garage surveillance video database, or a shopping mall surveillance video database. It may be understood that, in another embodiment of the disclosure, the video database may alternatively be a film and/or television video database. Therefore, the video database in an embodiment of the disclosure may be any video database on which video content retrieval needs to be performed. The disclosure is not specifically limited herein.

Figure 2C:
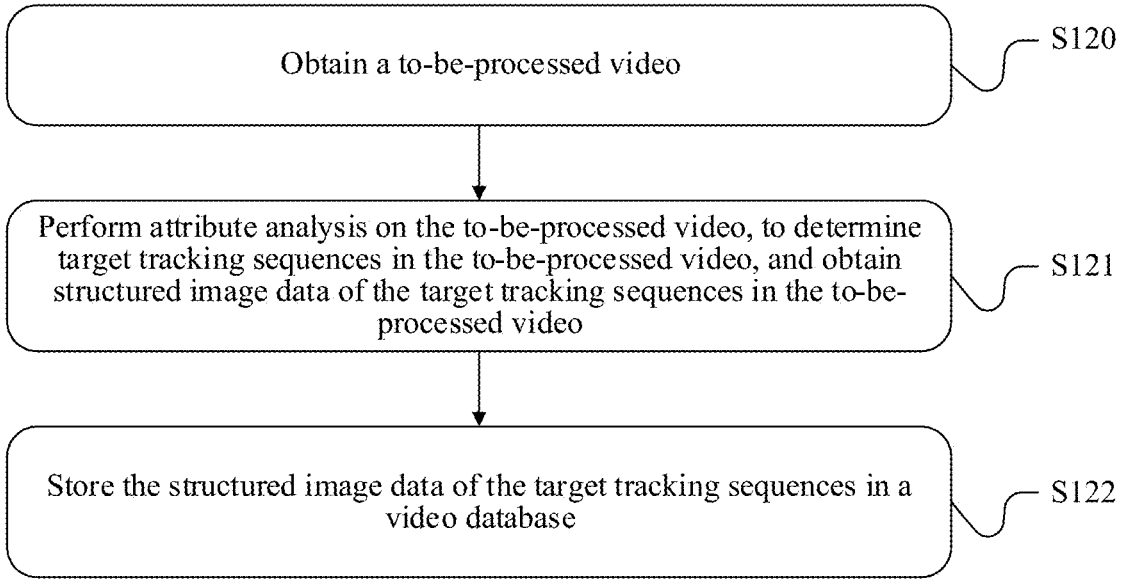
FIG. 2C is a flowchart of an operation of processing a video and storing a processing result in a video database according to an embodiment of the disclosure.

For the video database, new video data is updated and stored constantly. Therefore, some processing is performed on a video to be stored in the video database, to facilitate generation and search of a video abstract when video content is retrieved subsequently. Therefore, in an embodiment of the disclosure, before the obtaining a target screening condition for generating a video abstract, the method further includes an operation of processing a video and storing a processing result in the video database. FIG. 2C is a flowchart of processing a video and storing a processing result in a video database. As shown in FIG. 2C, in an embodiment of the disclosure, the method may further include the following operations.

S120. Obtain a video.

S121. Perform attribute analysis on the video, to determine target tracking sequences in the video, and obtain structured image data of the target tracking sequences in the video.

S122. Store the structured image data of the target tracking sequences in a video database.

The video may be video data to be stored in the video database. Assuming that the video database is a surveillance video database, the video may be video data newly added within a time period, for example, video data newly added within one day, or video data newly added within one hour, or video data newly added within half a day, and may be specifically set according to an actual scenario requirement.

Figure 2D:
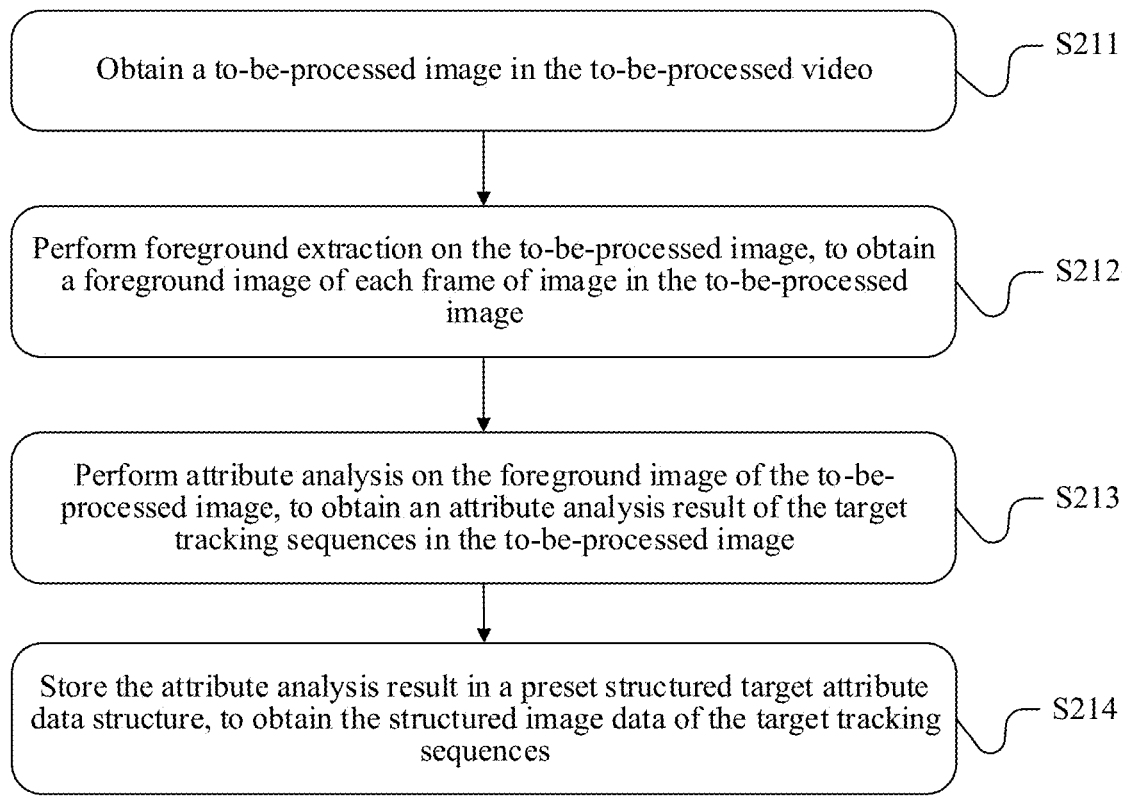
FIG. 2D is a flowchart of operation S121 according to an embodiment of the disclosure.

FIG. 2D is a flowchart of operation S121 according to an embodiment. As shown in FIG. 2D, operation S121 may include the following operations.

S211. Obtain an image to be processed in the video.

S212. Perform foreground extraction on the image, to obtain a foreground image of each frame of the image.

S213. Perform attribute analysis on the foreground image of the image, to obtain an attribute analysis result of the target tracking sequences in the image.

In some embodiments, a target box in a current frame in the image is compared with a target box of a previous frame, a target having a strongest feature response (that is, a highest matching degree between an image in the target box in the current frame and an image in the target box of the previous frame) is selected as a target to be tracked, and the target is tracked. After tracking of the target ends, or a preset quantity of frames (for example, 1000 frames) are tracked, tracking of the target is completed. In this case, a frame sequence including the tracked target in an obtained image is a target tracking sequence.

In some embodiments, after target tracking sequences in an image are obtained, that is, attribute analysis is performed on each target tracking sequence, an attribute analysis result is obtained, and the attribute analysis result may include attribute information of each target tracking sequence.

S214. Store the attribute analysis result in a preset structured target attribute data structure, to obtain the structured image data of the target tracking sequences.

The obtaining an image in the video may be obtaining each frame of an image in the video. For a surveillance video, there may be a surveillance image that does not change for a long time. Therefore, to improve subsequent processing efficiency, the obtaining an image in the video may alternatively be obtaining a key frame image in the video. When the key frame image in the video is obtained, the obtaining an image in the video may include: performing key frame detection on the video, to obtain a key frame in the video, and using the key frame as the image to be processed. When the key frame detection is performed on the video, an existing key frame extraction algorithm may be adopted. Only one key frame may be selected from, for example, a large quantity of repeated images with little change in the video by using the key frame detection, or no key frame is selected (for example, there is no any object in a surveillance image).

In an embodiment of the disclosure, background modeling may be performed in advance, to perform foreground extraction on the image, to obtain a foreground image of each frame of the image. After the background modeling is performed, the process of performing foreground extraction on the image, to obtain a foreground image of each frame of the image may be rapidly implemented. Operations of the process may include: converting each frame of the image into a single-channel grayscale map, extracting a local feature map of a preset type in each frame of the image, and determining the foreground image of each frame of the image according to the single-channel grayscale map of each frame of image and the local feature map of each frame of image. Further, the determining the foreground image of each frame of the image according to the single-channel grayscale map of each frame of image and the local feature map of each frame of image may include: synthesizing the single-channel grayscale map of each frame of image and the local feature map of each frame of image into an effective image of each frame of image, and matching the effective image of each frame of image with a preset Gaussian mixture model, to obtain the foreground image of each frame of the image.

Figure 3:
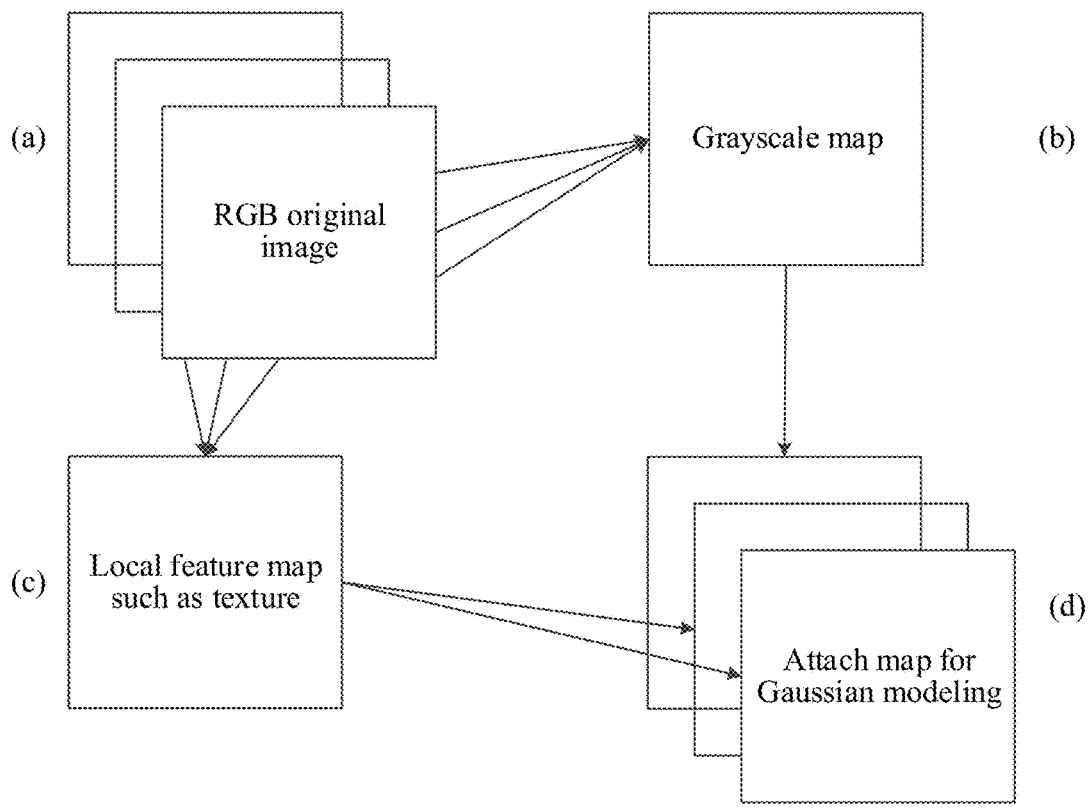
FIG. 3 is a schematic diagram of synthesizing a single-channel grayscale map and a local feature map according to an embodiment of the disclosure.

The following gives a description by using an example. As shown in FIG. 3, in the background modeling, an input of the Gaussian mixture model is a multi-channel image (d), and different channels of the image correspond to different data sources (b) and (c). A video frame (a) in an image may be a color image, that is, a red green blue (RGB) three-channel image (the color is obtained by mixing red, green, and blue according to different ratios, and therefore, the color image includes three monochrome images representing a red channel, a green channel, and a blue channel respectively). In an embodiment, an RGB three-channel image (a) of each frame of image is compressed and synthesized as a single-channel grayscale map (b) of each frame of image and used as a channel of the multi-channel image (d) inputted into the Gaussian mixture model, a local feature (features such as a texture and a shape) image (c) extracted from the RGB three-channel image (a) based on each frame of image is used as another channel of the multi-channel image (d) inputted into the Gaussian mixture model, and the single-channel grayscale map (b) and the local feature map (c) are jointly synthesized as a multi-channel image (d) (that is, an effective image of each frame of image) and used as an input of the Gaussian mixture model.

In the process of matching the effective image of each frame of image with a preset Gaussian mixture model, to obtain the foreground image of each frame of the image, the Gaussian mixture model separates foreground information and background information from the effective image and updates itself slowly and gradually, so that the stored and maintained background information maintains consistent with the latest background information. Specifically, the Gaussian mixture model is updated after a frame of foreground image is obtained by using the Gaussian mixture model (in this case, a corresponding background image is determined). Because updating the Gaussian mixture model in the process of obtaining the foreground image and the background image by separating an image is known in the art, specific details are not described herein again.

After the foreground image of each frame of the image is obtained through background modeling, further processing may be performed on the obtained foreground image. For example, through a technical means of extracting an outline and then filling after a foreground segmentation image is expanded, holes and defects of the foreground image may be further reduced, so that the extracted foreground image has a better effect.

In the process of performing foreground extraction on the image, to obtain a foreground image of each frame of the image, because each frame of image is formed by a foreground image and a background image, after the foreground image is extracted from each frame of image, the background image of the frame of image may be determined, and the background image may be correspondingly stored, to facilitate subsequent use. If the video is a surveillance video, a shooting angle may be fixed because a surveillance camera is generally fixed. In this way, a background image of the shot image is relatively fixed. For example, the surveillance camera always faces an intersection, and a shot video background is always a background image of the intersection. Therefore, the background image may be stored according to a preset duration, or stored according to a ratio of a preset quantity of frames of the foreground image (that is, each background image corresponds to a foreground image of a preset quantity of frames in each target tracking sequence). For example, a background image is stored every 30 minutes in a video, a foreground image of the target tracking sequence at the time period corresponds to the background image, or each time 1000 frames of foreground image are stored, one frame of background image is stored, that is, one frame of background image corresponds to 1000 frames of foreground image. In this way, the corresponding background image may be stored for each target tracking sequence.

Figure 2E:
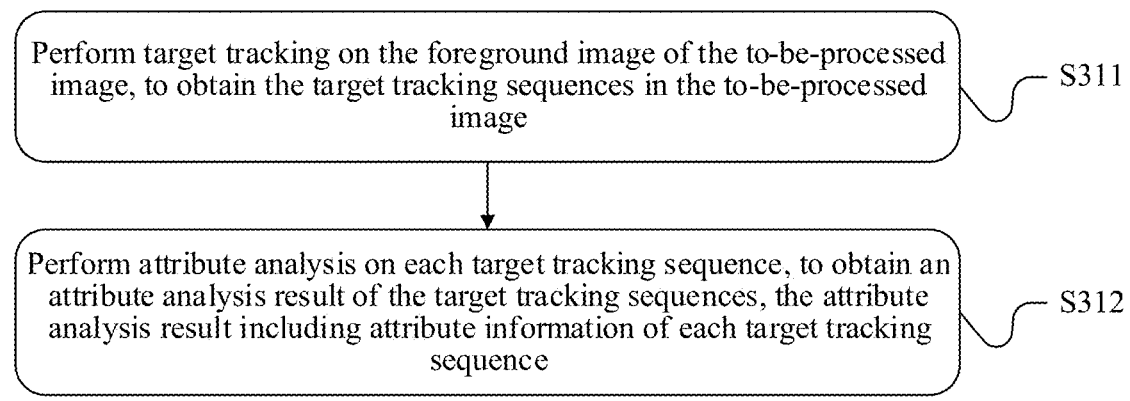
FIG. 2E is a flowchart of operation S213 according to an embodiment of the disclosure.

FIG. 2E is a flowchart of operation S213 according to an embodiment. As shown in FIG. 2E, operation S213 may include the following operations.

S311. Perform target tracking on the foreground image of the image, to obtain the target tracking sequences in the image.

S312. Perform attribute analysis on each target tracking sequence, to obtain an attribute analysis result of the target tracking sequences, the attribute analysis result including attribute information of each target tracking sequence.

The performing attribute analysis by using the foreground image of the image, to obtain an attribute analysis result of each target tracking sequence may adopt a preset target tracking algorithm, for example, a high-speed tracking with kernelized correlation filters (KCF) algorithm and a KCF algorithm improved algorithm. The KCF algorithm improved algorithm globally detects a current frame by using a target detection technology (a foreground extraction technology of background modeling in an embodiment may be used, or another detection technology may be used) to obtain a target box; the target box globally detected and a target box locally detected by using the KCF algorithm are compared with a target box of a previous frame; a target having a strongest feature response (that is, a highest matching degree between an image in the target box and an image in the target box of the previous frame) is selected as a target to be tracked; the target is tracked, and a target tracking sequence in the image may be obtained. In an embodiment of the disclosure, when tracking of the target ends, or a preset quantity (for example, 1000 frames) of frames are tracked, tracking of the target is completed.

After the target tracking sequences in the image are obtained, that is, attribute analysis is performed on each target tracking sequence; an attribute analysis result is obtained, which may include attribute information of each target tracking sequence; and the attribute information of the target tracking sequence may be extracted according to actual requirements. For example, the attribute information of the target tracking sequence may include color attribute information of the target tracking sequence, object class attribute information of the target tracking sequence, or target tracking direction attribute information of the target tracking sequence.

Figure 2F:
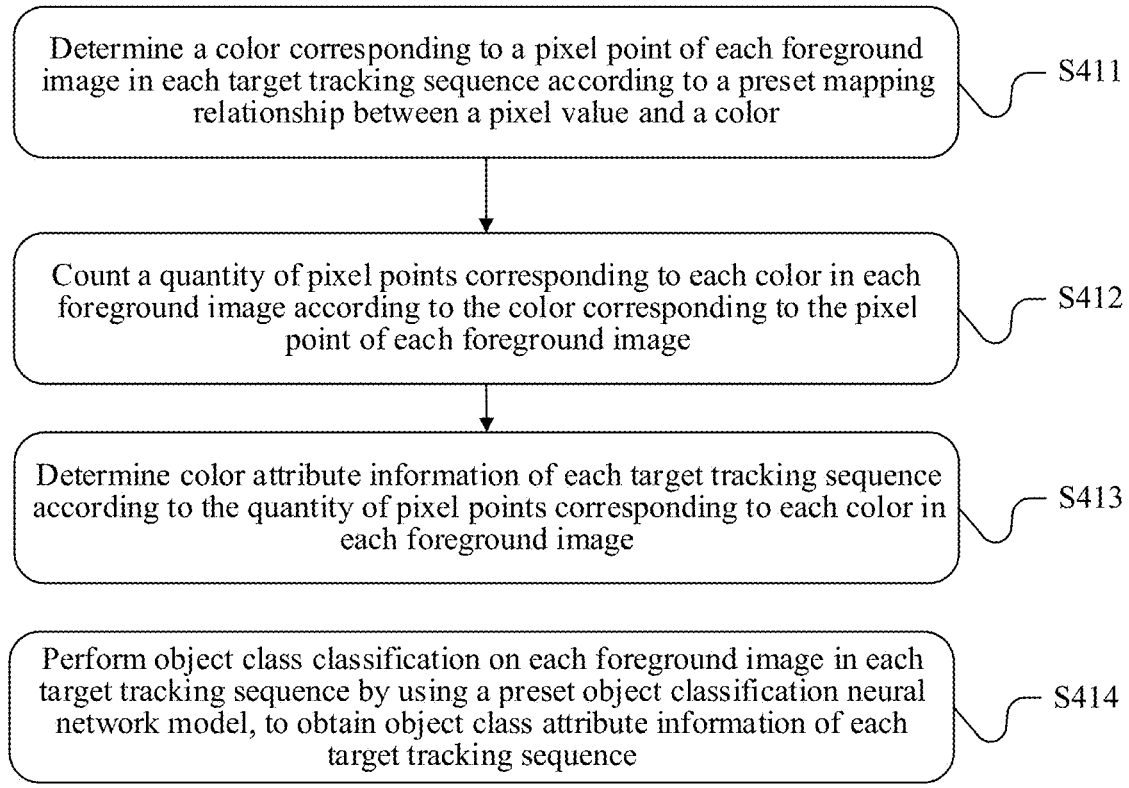
FIG. 2F is a flowchart of operation S312 according to an embodiment of the disclosure.

When the attribute analysis result includes the color attribute information of each target tracking sequence, FIG. 2F is a flowchart of operation S312 according to an embodiment. As shown in FIG. 2F, operation S312 includes the following operations.

S411. Determine a color corresponding to a pixel point of each foreground image in each target tracking sequence according to a preset mapping relationship between a pixel value and a color.

S412. Count a quantity of pixel points corresponding to each color in each foreground image according to the color corresponding to the pixel point of each foreground image.

S413. Determine the color attribute information of each target tracking sequence according to the quantity of pixel points corresponding to each color in each foreground image.

The preset mapping relationship between the pixel value and the color may be an RGB color model, a hue saturation value (HSV) color model, a YUV color model, a cyan magenta yellow black (CMYK) color model, or the like. The HSV is a relatively intuitive color model and is widely applied to many image processing fields. Therefore, the preset mapping relationship between the pixel value and the color may adopt the HSV color model. After the color corresponding to the pixel point of each foreground image in each target tracking sequence is determined according to the preset mapping relationship between the pixel value and the color, the quantity of pixel points corresponding to each color in each foreground image is counted according to the color corresponding to the pixel point of each foreground image. For example, in a foreground image A, 30 red pixel points and 40 black pixel points are determined.

Figure 2G:
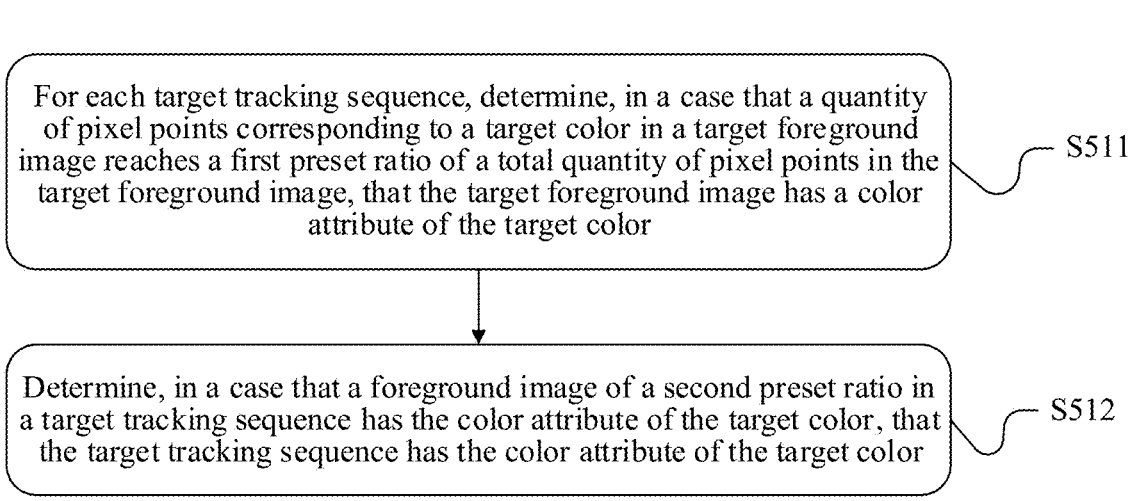
FIG. 2G is a flowchart of operation S413 according to an embodiment of the disclosure.

Further, FIG. 2G is a flowchart of operation S413 according to an embodiment. As shown in FIG. 2G, S413 may include the following operations.

S511. For each target tracking sequence, determine, in a case that a quantity of pixel points corresponding to a target color in a target foreground image reaches a first preset ratio of a total quantity of pixel points in the target foreground image, that the target foreground image has a color attribute of the target color.

S512. Determine, in a case that a foreground image of a second preset ratio in a target tracking sequence has the color attribute of the target color, that the target tracking sequence has the color attribute of the target color.

The first preset ratio and the second preset ratio may be set according to actual requirements, for example, the first preset ratio is 30%, and the second preset ratio is 90%. In this case, assuming that a target foreground image in a target tracking sequence includes 100 pixel points, including 30 red pixel points, 50 black pixel points, 10 white pixel points, and 10 other color pixel points, a ratio of the red pixel points to the total quantity of pixel points in the target foreground image is 30/100=30%, a ratio of the black pixel points to the total quantity of pixel points in the target foreground image is 50/100=50%, and a ratio of the white pixel points to the total quantity of pixel points in the target foreground image is 10/100=10%. Because a ratio of the red pixel points and the black pixel points to the total quantity of pixel points in the target foreground image is greater than the first preset ratio 30%, the red and the black are determined as attribute colors of the target foreground image. After the attribute colors of all the foreground images in the target tracking sequence are determined, if 90% of foreground images in the target tracking sequence have a red attribute, it is determined that the target tracking sequence has the red attribute.

When the attribute analysis result includes the object class attribute information of each foreground image in each target tracking sequence, FIG. 2F is a flowchart of operation S312 according to an embodiment. As shown in FIG. 2F, operation S312 may include the following operations.

S414. Perform object class classification on each foreground image in each target tracking sequence by using a preset object classification neural network model, to obtain the object class attribute information of each target tracking sequence.

The object classification neural network model may be an existing object classification neural network model, or may be obtained by training a constructed object classification neural network through a preset quantity of foreground images and object class information in corresponding foreground images. The technology of the object classification neural network model is relatively mature at present. Details are not described herein again.

Object class classification may be performed on each foreground image in each target tracking sequence by using the preset object classification neural network model to obtain the object class attribute information in each foreground image, for example, a person (may be further classified in detail, for example, male or female, adult or child), a bus, a car, or a non-motor vehicle. The classification corresponding to the object class attribute information may be specifically set according to actual requirements, for example, a person may be divided into male or female, or adult or child, or may have two classifications simultaneously, that is, male and adult. This is not specifically limited herein.

The foregoing describes attribute information of several target tracking sequences that may be included in the attribute analysis result by using examples, for example, the color attribute information of the target tracking sequence and the object class attribute information of the target tracking sequence. It may be understood that the attribute analysis result may further include other types of attribute information of the target tracking sequence and may be specifically set according to actual requirements, for example, the attribute analysis result may further include target tracking direction attribute information (e.g., information of a direction in which the target is tracked) of each target tracking sequence. The operation of performing attribute analysis on each target tracking sequence, to obtain an attribute analysis result of the target tracking sequences may further include: determining a tracking direction angle of a target according to location information of the target in each foreground image in each target tracking sequence, for example, the target moves from south to north while being tracked.

Figure 2H:
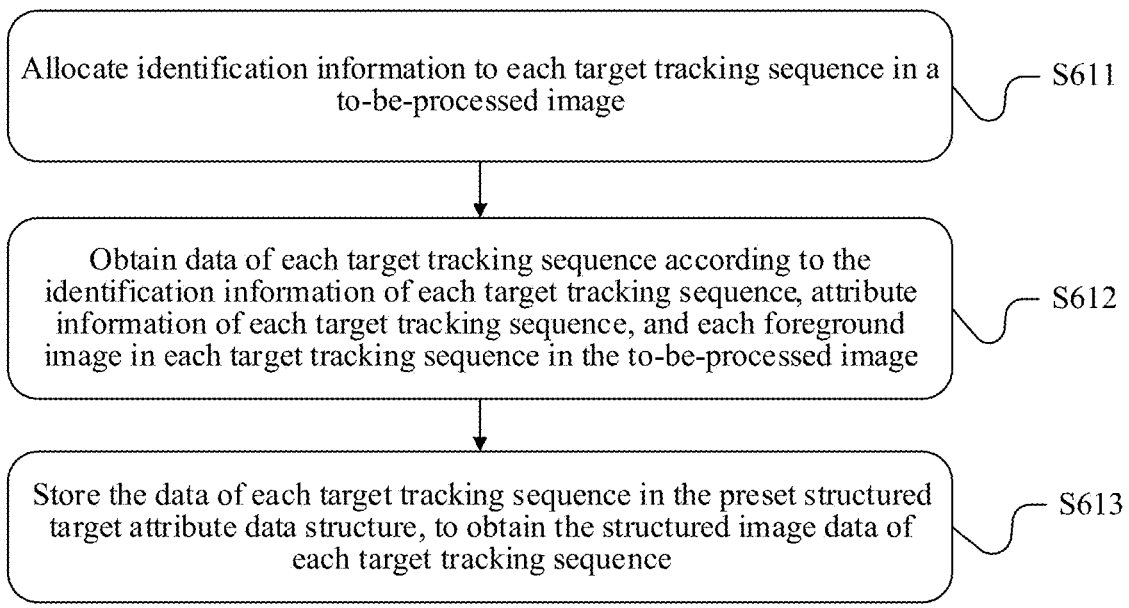
FIG. 2H is a flowchart of operation S214 according to an embodiment of the disclosure.

In an embodiment of the disclosure, FIG. 2H is a flowchart of operation S214 after the attribute analysis result is obtained. As shown in FIG. 2H, the process of storing the attribute analysis result in a preset structured target attribute data structure, to obtain the structured image data of the target tracking sequences may include the following operations.

S611. Allocate identification information to each target tracking sequence in an image.

5612. Obtain data of each target tracking sequence according to the identification information of each target tracking sequence, attribute information of each target tracking sequence, and each foreground image in each target tracking sequence in the image.

S613. Store the data of each target tracking sequence in the preset structured target attribute data structure, to obtain the structured image data of each target tracking sequence.

Specifically, for each target tracking sequence in an image, identification information may be allocated according to a preset rule, for example, identification information is allocated according to a numerical number or an alphabetical number, for example, an identity (ID) of a target tracking sequence, specifically, a target tracking sequence 1 or a target tracking sequence A, where 1 or A is the ID of the target tracking sequence. In another example, the ID of the target tracking sequence may be a time corresponding to the target tracking sequence.

The storing the data of each target tracking sequence in the preset structured target attribute data structure, to obtain the structured image data of each target tracking sequence may include: invoking a preset structured data storage interface to store the data of each target tracking sequence in the preset structured target attribute data structure. An example of the target attribute data structure is specifically shown in the following Table 1:

TABLE 1

| Target tracking sequence ID | Attribute information of target tracking sequence | Foreground frame of target tracking sequence | Background frame corresponding to target tracking sequence |
| --- | --- | --- | --- |

The data of each target tracking sequence is stored in the preset structured target attribute data structure, and the obtained structured image data of each target tracking sequence may further include a background image corresponding to each target tracking sequence. In addition, each foreground frame in the target tracking sequence includes time information of the foreground frame.

After the structured image data of each target tracking sequence is obtained, the structured image data of each target tracking sequence may be stored in a video database. In this way, for a new video that needs to be processed, structured storage of the video may be implemented according to the foregoing operation operations, and corresponding video content may be screened (or searched) in the video database according to a screening condition (or searching condition).

Figure 2I:
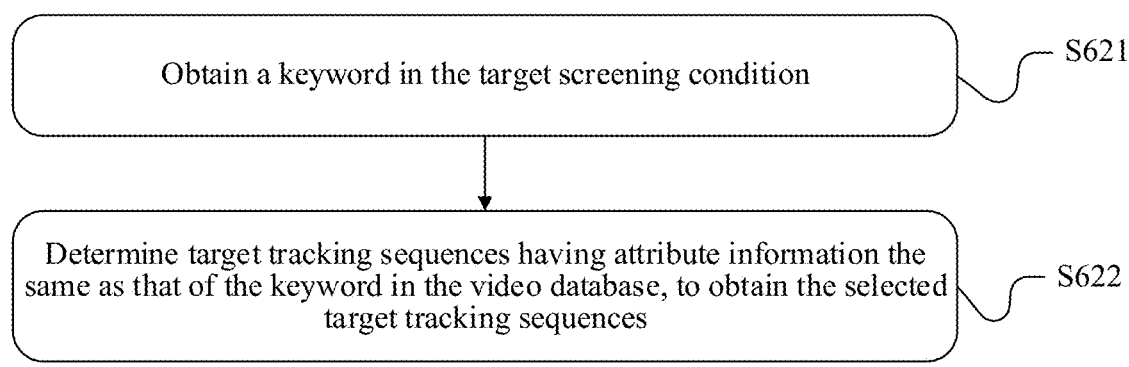
FIG. 2I is a flowchart of operation S123 according to an embodiment of the disclosure.

Therefore, in an embodiment of the disclosure, after the target screening condition is obtained, the selected target tracking sequences may be determined in the video database according to the target screening condition. Further, FIG. 2I is a flowchart of operation S123 in an embodiment. As shown in FIG. 2I, the determining selected target tracking sequences in the video database according to the target screening condition may include:

S621. Obtain a keyword in the target screening condition.

S622. Determine a target tracking sequence having attribute information the same as that of the keyword in the video database, to obtain the selected target tracking sequences.

That is, the selected target tracking sequences are target tracking sequences having attribute information the same as that of the keyword in the target screening condition in the video database.

For example, assuming that the target screening condition includes keywords of "red" and "male", and a screening time range is Mar. 1, 2018 to Mar. 2, 2018, the video database is searched for, according to the keywords of "red" and "male", target tracking sequences having a time period of Mar. 1, 2018 to Mar. 2, 2018 and attribute information of "red" and "male", that is, the selected target tracking sequences are obtained.

Structured image data of the selected target tracking sequences is obtained from the video database, to obtain the structured image data meeting the target screening condition.

After the selected target tracking sequences are obtained, structured image data of the selected target tracking sequences may be obtained, to obtain the structured image data meeting the target screening condition.

S103. Perform video synthesis on the structured image data meeting the target screening condition, to generate the video abstract.

Because the video database further includes a plurality of background images corresponding to each target tracking sequence, each of the plurality of background images may correspond to a foreground image of a preset quantity of frames in each target tracking sequence. In this case, the performing video synthesis on the structured image data meeting the target screening condition, to generate the video abstract may include:

(1) Obtain a target synthesis density in the target screening condition.

The target synthesis density represents a quantity of targets in each frame of image in the generated video abstract. For example, if the target synthesis density is three, each frame of image in the generated video abstract includes three targets.

(2) Create N synthesis queues corresponding to the target synthesis density, N being a positive integer.

N is equal to the target synthesis density. For example, if the target synthesis density is three, N=3, and three synthesis queues are created.

(3) Evenly allocate target tracking sequences in the selected target tracking sequences to the N synthesis queues.

Assuming that target tracking sequences in a video include 30 target tracking sequences, the 30 target tracking sequences are allocated according to the target synthesis density of three, that is, 10 target tracking sequences are allocated to each synthesis queue.

(4) Sequentially attach a foreground image of a corresponding target tracking sequence in the N synthesis queues to a corresponding background image, to generate the video abstract.

Specifically, when foreground images of corresponding target tracking sequences in the N synthesis queues are attached to a plurality of background images, every m foreground images in each synthesis queue are attached to one of the plurality of background images correspondingly, and m is a quantity of foreground images corresponding to one background image, for example, 1000. One background image may correspond to a background at each time of synthesizing every 1000 foreground images in each synthesis queue, and after the number of foreground images that are synthesized exceeds 1000, the background image is switched. For each synthesized image in a video abstract, a specific synthesizing method may be as follows: The first foreground images of N synthesis queues are all attached to a corresponding background image to synthesize the first frame of a result video, the new first foreground images of the N synthesis queues are attached to a corresponding background image to synthesize the second frame of the result video, and so on. When an $(m+1)^{th}$ synthesis image is synthesized, all synthesized images of the final video abstract are obtained. The video abstract may be generated according to all the synthesized images of the video abstract.

In an embodiment of the disclosure, because structured storage is performed on a video, after reselecting a screening condition, a user does not need to re-analyze an original video and may directly read structured image data in a video database according to the new screening condition to rapidly synthesize a corresponding video abstract. Therefore, the method in an embodiment of the disclosure may further include: obtaining a new screening condition for generating a video abstract, determining a new selected target tracking sequence from a video database according to the new screening condition, obtaining structured image data of the new selected target tracking sequence from the video database, to obtain new structured image data, and performing video synthesis on the new structured image data, to generate a new video abstract. Specifically, for the manner of generating a new video abstract, reference may be made to the manner described in the foregoing embodiments. Details are not described herein again.

According to an embodiment of the disclosure, a target screening condition for generating a video abstract is obtained, a video database is searched for structured image data according to the target screening condition, to obtain structured image data meeting the target screening condition, and video synthesis is performed on the structured image data meeting the target screening condition, to generate the video abstract. In an embodiment of the disclosure, because structured image data of a video image is stored in a video database, when searching for a video, a user may quickly obtain information of the video from the structured image data, to generate a video abstract. On one hand, it is greatly convenient for the user to locate video target content, and an application scenario of the video abstract is greatly expanded. Additionally, a generation process of the video abstract is facilitated and accelerated, and operation efficiency of a server device is improved.

The following describes the video abstract generation method in an embodiment of the disclosure with reference to an example application scenario.

Figure 4:
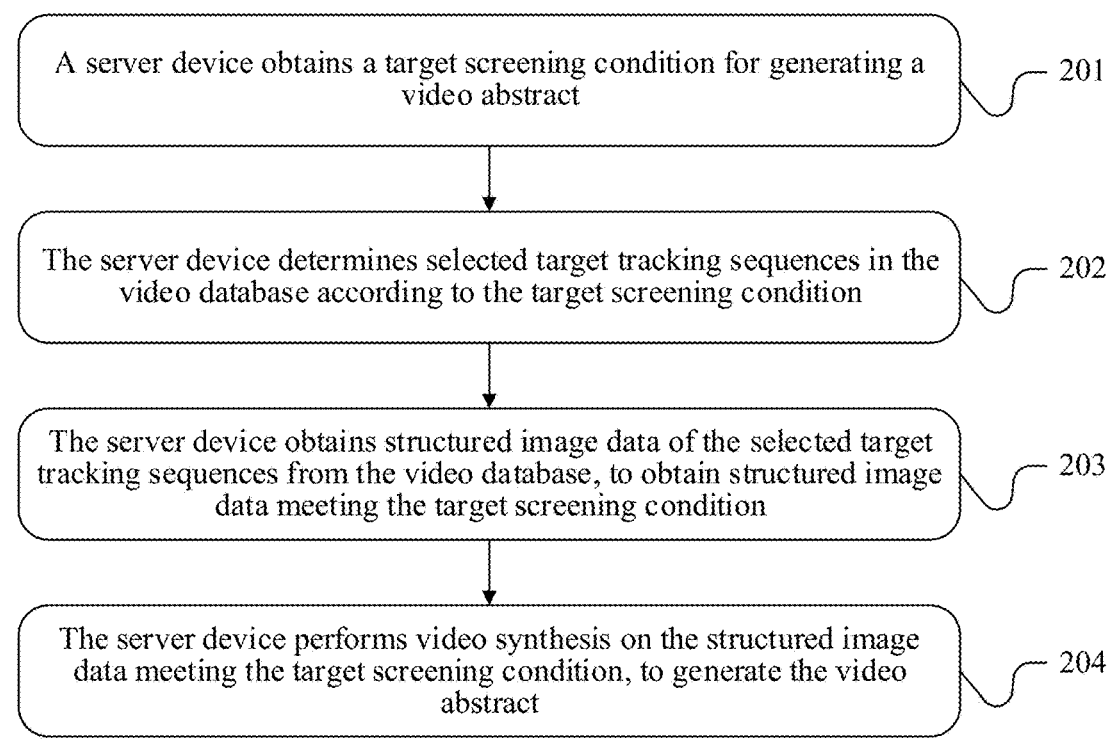
FIG. 4 is a schematic diagram of another embodiment of a video abstract generation method according to an embodiment of the disclosure.

FIG. 4 is another schematic flowchart of a video abstract generation method according to an embodiment of the disclosure. The method is performed by a server device and a procedure of the method may include the following operations 201-204.

201. A server device obtains a target screening condition for generating a video abstract.

In some embodiments, when a user needs to perform video content screening in a preset video database, the user may select a screening condition from preset screening options to obtain the target screening condition.

Figure 5:
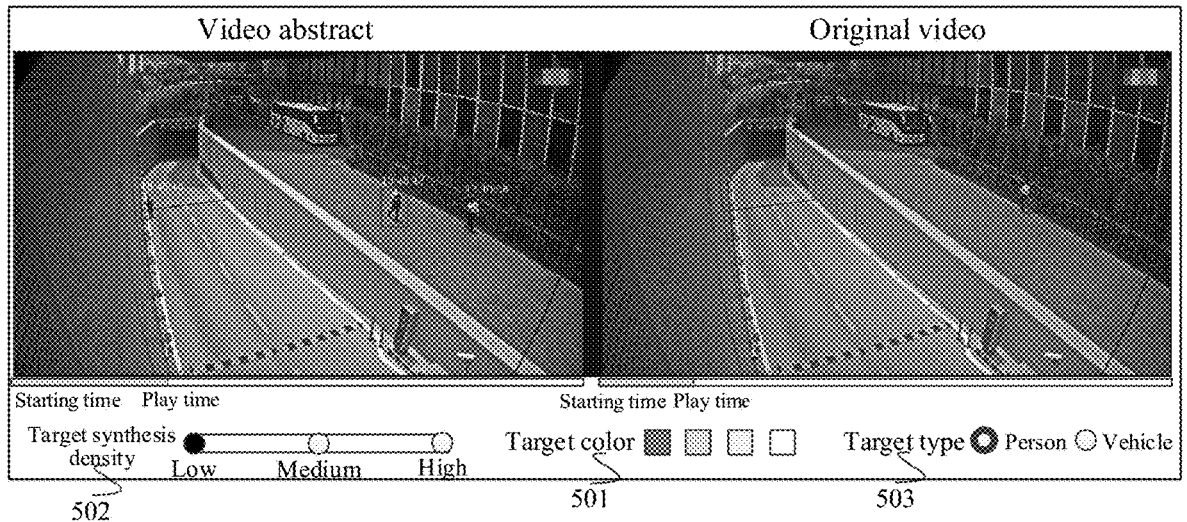
FIG. 5 is a schematic diagram of an embodiment of a video abstract generation application scenario according to an embodiment of the disclosure.

FIG. 5 is an example diagram of an example scenario according to an embodiment of the disclosure. In the example, the screening options include a color option 501, a target synthesis density option 502, and a target type option

503. "Unlimited" is selected in the color option (that is, a target color is not limited), a "low" level is selected in the target synthesis density option (indicating that there are three targets in each frame of image in the generated video abstract), and "person" is selected in the target type option. Content selected in the screening options forms the target screening condition.

202. The server device determines selected target tracking sequences in the video database according to the target screening condition.

The server device searches, according to the target screening condition, the video database for target tracking sequences having attribute information of "not limit color" and "person", that is, the selected target tracking sequences are obtained. It is assumed that there are 30 selected target tracking sequences.

203. The server device obtains structured image data of the selected target tracking sequences from the video database, to obtain structured image data meeting the target screening condition.

After the selected target tracking sequences are obtained, the server device may obtain the structured image data of the selected target tracking sequences, to obtain the structured image data, the structured image data being image data stored in a structured manner.

204. The server device performs video synthesis on the structured image data meeting the target screening condition, to generate the video abstract.

In FIG. 5, because the target screening condition is a "low" level target synthesis density, it indicates that there are three targets in each frame of image in the generated video abstract. In this case, that the server device performs video synthesis on the structured image data, to generate the video abstract includes: creating three synthesis queues corresponding to a target synthesis density, and perform even allocation according to the target synthesis density of three, that is, allocating 30/3=10 target tracking sequences to each synthesis queue. Assuming that each background image corresponds to 1000 foreground images, the first foreground images of the three synthesis queues are all attached to a corresponding background image to synthesize the first frame of a result video. For each synthesized image in the video abstract, a specific synthesizing method may be as follows: The new first foreground images of the three synthesis queues are attached to a corresponding background image to synthesize the second frame of the result video, and so on. When the $1001^{st}$ synthesized image is synthesized, a next background image is switched to be attached, and all synthesized images of a final video abstract are obtained. The video abstract may be generated according to all the synthesized image of the video abstract. As shown in FIG. 5, each frame of image in the generated video abstract includes three target characters, and time information corresponding to each target character is marked in each frame of image.

As shown in FIG. 5, in an embodiment of the disclosure, an original video may be displayed in an interface displaying a video abstract, or an original video may not be displayed, and may be specifically set according to actual requirements.

According to an embodiment of the disclosure, the server device obtains a target screening condition for generating a video abstract, determines selected target tracking sequences from a video database according to the target screening condition, the video database storing structured image data using a target tracking sequence as a unit, obtains structured image data of the selected target tracking sequences from the video database, to obtain structured image data meeting the target screening condition, and performs video synthesis on the structured image data, to generate the new video abstract. In an embodiment of the disclosure, because structured image data of a video image is stored in a video database in a unit of a target tracking sequence, when a user retrieves a related video, a server device may quickly screen related video information from the structured image data, to generate a video abstract. It is greatly convenient for the user to locate video target content, and an application scenario of the video abstract is greatly expanded.

To help better implement the video abstract generation method provided in the embodiments of the disclosure, the embodiments of the disclosure further provide an apparatus that is based on the foregoing video abstract generation method. The same elements have meanings the same as those in the foregoing video abstract generation method, and for specific implementation details, reference may be made to the descriptions in the method embodiments.

Figure 6A:
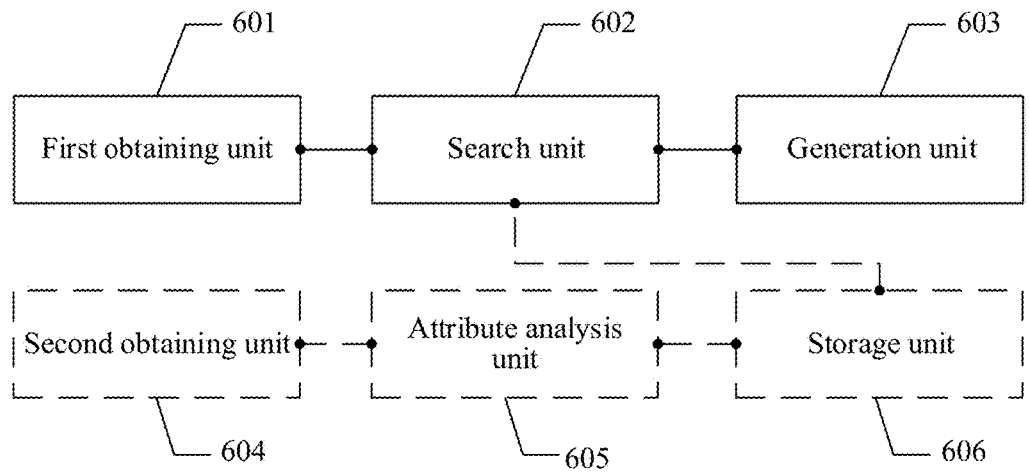
FIG. 6A is a schematic diagram of an embodiment of a video abstract generation apparatus according to an embodiment of the disclosure.

FIG. 6A is a schematic structural diagram of a video abstract generation apparatus according to an embodiment of the disclosure. The video abstract generation apparatus may include a first obtaining unit 601, a search unit 602, and a generation unit 603. Details are as follows:

the first obtaining unit 601 is configured to obtain a target screening condition (or target searching condition) for generating a video abstract;

the search unit 602 is configured to search a video database for structured image data according to the target screening condition, to obtain structured image data, the structured image data being image data stored in a structured manner; and the generation unit 603 is configured to perform video synthesis on the structured image data meeting the target screening condition, to generate the video abstract.

Figure 6B:
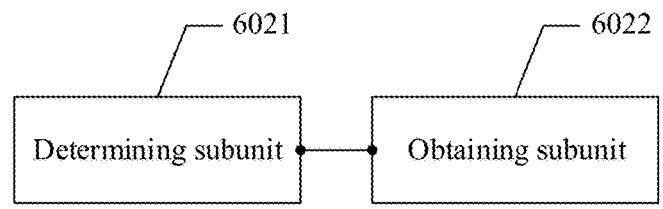
FIG. 6B is a schematic structural diagram of a search unit according to an embodiment of the disclosure.

In some embodiments, FIG. 6B is a schematic structural diagram of a search unit 602 according to an embodiment of the disclosure. As shown in FIG. 6B, the search unit 602 includes a determining subunit 6021 and an obtaining subunit 6022. Details are as follows:

the determining subunit 6021 is configured to determine selected target tracking sequences in the video database according to the target screening condition, the video database storing structured image data using a target tracking sequence as a unit; and the obtaining subunit 6022 is configured to obtain structured image data of the selected target tracking sequences from the video database, to obtain structured image data meeting the target screening condition.

In some embodiments, the apparatus further includes a second obtaining unit 604, an attribute analysis unit 605, and a storage unit 606. Details are as follows:

the second obtaining unit 604 is configured to obtain a video;

the attribute analysis unit 605 is configured to perform attribute analysis on the video, to determine target tracking sequences in the video, and obtain structured image data of target tracking sequences in the video; and the storage unit 606 is configured to store the structured image data of the target tracking sequences in the video in the video database.

Figure 6C:
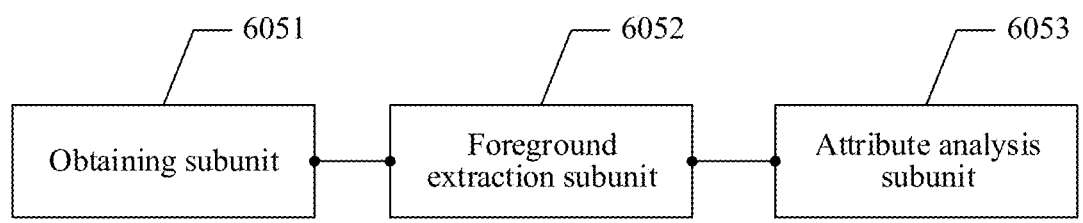
FIG. 6C is a schematic structural diagram of an attribute analysis unit according to an embodiment of the disclosure.

In some embodiments, FIG. 6C is a schematic structural diagram of an attribute analysis unit 605 according to an embodiment of the disclosure. As shown in FIG. 6C, the attribute analysis unit 605 includes an obtaining subunit 6051, a foreground extraction subunit 6052, and an attribute analysis subunit 6053. Details are as follows:

the obtaining subunit 6051 is configured to obtain an image in the video;

the foreground extraction subunit 6052 is configured to perform foreground extraction on the image, to obtain a foreground image of each frame of the image; and the attribute analysis subunit 6053 is further configured to perform attribute analysis on the foreground image of the image, to obtain an attribute analysis result of the target tracking sequences in the image.

The storage unit 606 is further configured to store the attribute analysis result in a preset structured target attribute data structure, to obtain the structured image data of the target tracking sequences.

In some embodiments, the attribute analysis subunit 6053 is configured to:

perform target tracking on the foreground image of the image, to obtain target tracking sequences in the image; and perform attribute analysis on each target tracking sequence, to obtain an attribute analysis result of the target tracking sequences, the attribute analysis result including attribute information of each target tracking sequence.

In some embodiments, the attribute analysis result includes color attribute information of each target tracking sequence, and the attribute analysis subunit 6053 is configured to:

determine a color corresponding to a pixel point of each foreground image in each target tracking sequence according to a preset mapping relationship between a pixel value and a color;

count a quantity of pixel points corresponding to each color in each foreground image according to the color corresponding to the pixel point of each foreground image; and determine the color attribute information of each target tracking sequence according to the quantity of pixel points corresponding to each color in each foreground image.

In some embodiments, the attribute analysis subunit 6053 is configured to:

for each target tracking sequence, determine, in a case that a quantity of pixel points corresponding to a target color in a target foreground image reaches a first preset ratio of a total quantity of pixel points in the target foreground image, that the target foreground image has a color attribute of the target color; and determine, in a case that a foreground image of a second preset ratio in a target tracking sequence has the color attribute of the target color, that the target tracking sequence has the color attribute of the target color.

In some embodiments, the attribute analysis result includes object class attribute information of each foreground image in each target tracking sequence, and the attribute analysis subunit 6053 is configured to:

perform object class classification on each foreground image in each target tracking sequence by using a preset object classification neural network model, to obtain the object class attribute information of each target tracking sequence.

In some embodiments, the foreground extraction subunit 6052 is configured to:

convert each frame of the image into a single-channel grayscale map;

extract a local feature map of a preset type from each frame of the image; and determine the foreground image of each frame of the image according to the single-channel grayscale map of each frame of image and the local feature map in each frame of image.

In some embodiments, the foreground extraction subunit 6052 is configured to:

synthesize the single-channel grayscale map of each frame of image and the local feature map in each frame of image into an effective image of each frame of image; and match the effective image of each frame of image with a preset Gaussian mixture model, to obtain the foreground image of each frame of the image.

In some embodiments, the storage unit 606 is configured to:

allocate identification information to each target tracking sequence in the image;

obtain data of each target tracking sequence according to the identification information of each target tracking sequence in the image, attribute information of each target tracking sequence, and each foreground image in each target tracking sequence; and store the data of each target tracking sequence in the preset structured target attribute data structure, to obtain the structured image data of each target tracking sequence in the image.

In some embodiments, the obtaining subunit 6051 is configured to:

perform key frame detection on a video, to obtain a key frame in the video; and use the key frame as the image.

In some embodiments, the determining subunit 6021 is configured to:

obtain a keyword in the target screening condition; and determine a target tracking sequence having attribute information the same as that of the keyword in the video database, to obtain the selected target tracking sequence.

In some embodiments, the video database further includes a plurality of background images corresponding to each target tracking sequence, each of the plurality of background images corresponds to a foreground image of a preset quantity of frames in each target tracking sequence, and the generation unit 603 is configured to:

obtain a target synthesis density in the target screening condition;

create N synthesis queues corresponding to the target synthesis density, N being a positive integer;

evenly allocate target tracking sequences in the selected target tracking sequences to the N synthesis queues; and sequentially attach a foreground image of a corresponding target tracking sequence in the N synthesis queues to a corresponding background image, to generate the video abstract.

During specific implementation, the foregoing units may be implemented as independent entities, or may be randomly combined, or may be implemented as one entity or several entities. For specific implementation of the foregoing units, reference may be made to the foregoing method embodiments. Details are not described herein again.

According to an embodiment of the disclosure, the first obtaining unit 601 obtains a target screening condition for generating a video abstract, the determining unit 602 searches a video database for structured image data according to the target screening condition, to obtain structured image data, the structured image data being image data stored in a structured manner, and the generation unit 603 performs video synthesis on the structured image data meeting the target screening condition, to generate the video abstract. In an embodiment of the disclosure, because structured image data of a video image is stored in a video database, when a user retrieves a related video, related video information may be rapidly screened from the structured image data, to generate a video abstract. It is greatly convenient for the user to locate video target content, and an application scenario of the video abstract is greatly expanded.

Figure 7:
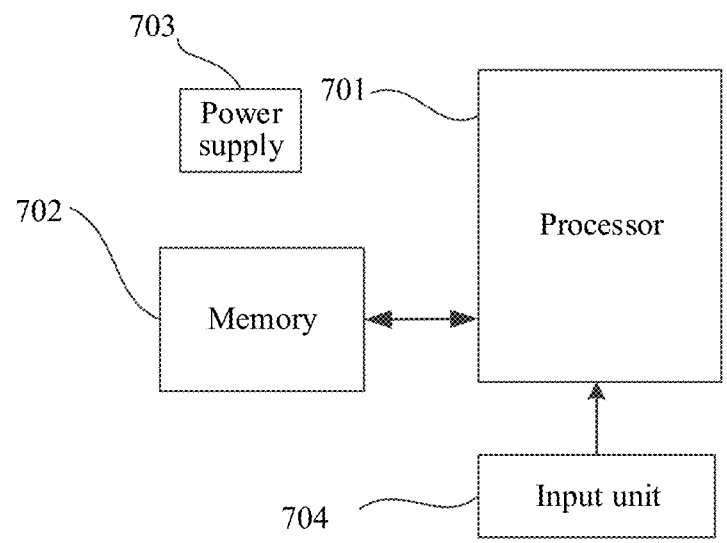
FIG. 7 is a schematic structural diagram of a server device according to an embodiment of the disclosure.

An embodiment of the disclosure further provides a computing device, and the computing device may be a server device. FIG. 7 is a schematic structural diagram of a server device according to an embodiment of the disclosure. Specifically:

The server device may include components such as a processor 701 including one or more processing cores, a memory 702 including one or more computer-readable storage mediums, a power supply 703, and an input unit 704. A person skilled in the art would understand that the server device structure shown in FIG. 7 does not constitute a limitation to the server device. The server device may include more or fewer parts than those shown in the figure, may combine some parts, or may have different part arrangements.

The processor 701 controls an overall operation of the server device, and is connected to various parts of the entire server device by using various interfaces and lines. By running or executing a software program and/or module stored in the memory 702, and invoking data stored in the memory 702, the processor 701 executes various functions of the server device and performs data processing, thereby monitoring the entire server device. In some embodiments, the processor 701 may include the one or more processing cores; the processor 701 may integrate an application processor and a modem processor. The application processor mainly processes an operating storage medium, a user interface, an application program, and the like. The modem processor mainly processes wireless communication. It may be understood that the foregoing modem processor may not be integrated into the processor 701.

The memory 702 may be configured to store a software program and a module. The processor 701 runs the software program and the module stored in the memory 702, to perform various functional applications and data processing. The memory 702 may mainly include a program storage region and a data storage region. The program storage region may store an operating storage medium, an application program required by at least one function (such as a sound playing function and an image display function), and the like. The data storage region may store data created according to use of the server device, and the like. In addition, the memory 702 may include a high-speed random access memory, and may also include a non-volatile memory such as at least one disk storage device, a flash memory device, or another volatile solid-state storage device. Correspondingly, the memory 702 may further include a memory controller, so that the processor 701 can access the memory 702.

The server device further includes the power supply 703 for supplying power to the components. The power supply 703 may be logically connected to the processor 701 by using a power management storage medium, thereby implementing functions such as charging, discharging, and power consumption management by using the power management storage medium. The power supply 703 may further include one or more direct current or alternate current power supplies, one or more re-charging storage mediums, one or more power supply fault detection circuits, one or more power supply converters or inverters, one or more power supply state indicators, or any other components.

The server device may include the input unit 704 configured to receive input digit or character information, and generate a keyboard, mouse, joystick, optical, or track ball signal input related to the user setting and function control.

Although not shown in the figure, the server device may further include a display unit. Details are not further described herein. Specifically, in an embodiment, the processor 701 in the server device may load executable files corresponding processes of the one or more application programs to the memory 702 according to the following instructions, and runs the application programs stored in the memory 702, so as to implement various functions:

obtaining a target screening condition for generating a video abstract, searching a video database for structured image data according to the target screening condition, to obtain structured image data meeting the target screening condition, the structured image data being image data stored in a structured manner, and performing video synthesis on the structured image data meeting the target screening condition, to generate the video abstract.

A person of ordinary skill in the art could understand that, all or some operations of various methods in the embodiments may be implemented through instructions, or implemented through instructions controlling relevant hardware, and the instructions may be stored in a computer-readable storage medium and loaded and executed by a processor.

Accordingly, an embodiment of the disclosure provides a storage medium, storing a plurality of instructions, the instructions can be loaded by a processor, to perform the operations in any video abstract generation method according to the embodiments of the disclosure. For example, the instructions may perform the following operations:

obtaining a target screening condition for generating a video abstract, searching a video database for structured image data according to the target screening condition, to obtain structured image data, the structured image data being image data stored in a structured manner, and performing video synthesis on the structured image data meeting the target screening condition, to generate the video abstract.

For specific implementations of the foregoing operations, reference may be made to the foregoing embodiments. Details are not described herein again.

The storage medium may include: a read-only memory (ROM), a random access memory (RAM), a magnetic disk, an optical disc, or the like.

Since the instructions stored in the storage medium may perform the operations of any video abstract generation method in the embodiments of the disclosure, the instructions can implement beneficial effects that can be implemented by any video abstract generation method in the embodiments of the disclosure. For details, refer to the foregoing embodiments. Details are not further described herein.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The video abstract generation method and apparatus, and the storage medium provided in the embodiments of the disclosure are described above in detail. Although the principles and implementations of the disclosure are described by using specific examples in this specification, the descriptions of the foregoing embodiments are merely intended to help understand the method and the core idea of the method of the disclosure. It will be understood that various changes in form and details may be made therein without departing from the spirit and scope of the following claims.

What is claimed is:

1. A video abstract generation method, performed by a server device, the method comprising:
   obtaining a target searching condition;
   searching a video database for structured image data meeting the target searching condition, the structured image data being stored in the video database in a structured data format; and
   performing video synthesis on the structured image data meeting the target searching condition, to generate a video abstract,
   wherein the searching comprises determining selected target tracking sequences in the video database according to the target searching condition, the video database storing structured image data using a target tracking sequence as a unit, and
   wherein the performing the video synthesis comprises:
   generating N synthesis queues, N being a positive integer, and allocating the selected target tracking sequences in the video database to the N synthesis queues; and
   sequentially attaching a plurality of foreground images of a corresponding target tracking sequence in the N synthesis queues to a corresponding background image, to generate the video abstract.

2. The video abstract generation method according to claim 1, wherein the searching further comprises:
   obtaining, from structured image data corresponding to the selected target tracking sequences in the video database, the structured image data meeting the target searching condition.

3. The video abstract generation method according to claim 2, further comprising:
   performing attribute analysis on a video, to determine target tracking sequences in the video, and obtaining structured image data of the target tracking sequences in the video; and
   storing the structured image data of the target tracking sequences in the video database.

4. The video abstract generation method according to claim 3, wherein the performing the attribute analysis and the obtaining the structured image data of the target tracking sequences in the video comprises:
   performing foreground extraction on an image of the video, to obtain a foreground image of each frame of the image;
   performing attribute analysis on the foreground image of the image, to obtain an attribute analysis result of the target tracking sequences in the image; and
   storing the attribute analysis result in a preset structured target attribute data structure, to obtain the structured image data of the target tracking sequences.

5. The video abstract generation method according to claim 4, wherein the performing the attribute analysis on the foreground image of the image comprises:
   performing target tracking on the foreground image of the image, to obtain the target tracking sequences in the image; and
   performing attribute analysis on each target tracking sequence, to obtain the attribute analysis result, the attribute analysis result comprising attribute information of each target tracking sequence.

6. The video abstract generation method according to claim 5, wherein the attribute analysis result comprises color attribute information of each target tracking sequence, and the performing attribute analysis on each target tracking sequence comprises:
   determining a color corresponding to a pixel point of each foreground image in each target tracking sequence according to a preset mapping relationship between a pixel value and a color;
   counting a quantity of pixel points corresponding to each color in each foreground image according to the color corresponding to the pixel point of each foreground image; and
   determining the color attribute information of each target tracking sequence according to the quantity of pixel points corresponding to each color in each foreground image.

7. The video abstract generation method according to claim 6, wherein the determining the color attribute information comprises:
   for each target tracking sequence,
   determining, based on a quantity of pixel points corresponding to a target color in a target foreground image reaching a first preset ratio of a total quantity of pixel points in the target foreground image, that the target foreground image has a color attribute of the target color; and
   determining, based on a foreground image of a second preset ratio in a target tracking sequence having the color attribute of the target color, that the target tracking sequence has the color attribute of the target color.

8. The video abstract generation method according to claim 5, wherein the attribute analysis result comprises object class attribute information of each foreground image in each target tracking sequence, and the performing attribute analysis on each target tracking sequence comprises:
   performing object class classification on each foreground image in each target tracking sequence by using a preset object classification neural network model, to obtain the object class attribute information of each target tracking sequence.

9. The video abstract generation method according to claim 5, wherein the attribute analysis result comprises target tracking direction attribute information of each foreground image in each target tracking sequence, and the performing attribute analysis on each target tracking sequence comprises:
    determining a tracking direction angle of a target according to location information of the target in each foreground image in each target tracking sequence.

10. The method according to claim 5, wherein the storing the attribute analysis result comprises:
    allocating identification information to each target tracking sequence in the image;
    obtaining data of each target tracking sequence in the image according to the identification information of each target tracking sequence, the attribute information of each target tracking sequence, and each foreground image in each target tracking sequence; and
    storing the data of each target tracking sequence in the preset structured target attribute data structure, to obtain the structured image data of the target tracking sequences in the image.

11. The video abstract generation method according to claim 4, wherein the performing foreground extraction on the image comprises:
    converting each frame of the image into a single-channel grayscale map;
    extracting a local feature map of a preset type from each frame of the image; and
    determining the foreground image of each frame of the image according to the single-channel grayscale map of each frame of the image and the local feature map in each frame of the image.

12. The video abstract generation method according to claim 11, wherein the determining the foreground image of each frame of the image comprises:
    synthesizing the single-channel grayscale map of each frame of the image and the local feature map in each frame of the image into an effective image of each frame of the image; and
    matching the effective image of each frame of the image with a preset Gaussian mixture model, to obtain the foreground image of each frame of the image.

13. The video abstract generation method according to claim 4, wherein the image of the video is a key frame in the video obtained by performing key frame detection on the video.

14. The video abstract generation method according to claim 2, wherein data of the target tracking sequence comprises attribute information of the target tracking sequence, and
    the determining the selected target tracking sequences comprises:
    obtaining a keyword in the target searching condition; and
    determining, as a selected target tracking sequence, a target tracking sequence having attribute information the same as that of the keyword in the video database.

15. The video abstract generation method according to claim 2, wherein the video database further comprises a plurality of background images, and a plurality of foreground images of a preset quantity of frames in each target tracking sequence corresponding to one of the plurality of background images, and the performing the video synthesis further comprises:
    obtaining a target synthesis density in the target searching condition;
    wherein a number of the N synthesis queues is determined based on the target synthesis density.

16. A video abstract generation apparatus, comprising:
    at least one memory configured to store program code; and
    at least one processor configured to read the program code and operate as instructed by the program code, the program code comprising:
        first obtaining code configured to cause at least one of the at least one processor to obtain a target searching condition;
        search code configured to cause at least one of the at least one processor to search a video database for structured image data meeting the target searching condition, the structured image data being stored in the video database in a structured data format; and
        generation code configured to cause at least one of the at least one processor to perform video synthesis on the structured image data meeting the target searching condition, to generate a video abstract,
    wherein the search code causes at least one of the at least one processor to determine selected target tracking sequences in the video database according to the target searching condition, the video database storing structured image data using a target tracking sequence as a unit, and
    wherein the generation code is configured to cause at least one of the at least one processor to perform:
        generating N synthesis queues, N being a positive integer, and allocating the selected target tracking sequences in the video database to the N synthesis queues; and
        sequentially attaching a plurality of foreground images of a corresponding target tracking sequence in the N synthesis queues to a corresponding background image, to generate the video abstract.

17. The video abstract generation apparatus according to claim 16, wherein the search code comprises:
    second obtaining code configured to cause at least one of the at least one processor to, from structured image data corresponding to the selected target tracking sequences in the video database, obtain the structured image data meeting the target searching condition.

18. The video abstract generation apparatus according to claim 17, wherein the program code further comprises:
    performing code configured to cause at least one of the at least one processor to perform attribute analysis on a video, to determine target tracking sequences in the video, and obtaining structured image data of the target tracking sequences in the video; and
    storing code configured to cause at least one of the at least one processor to store the structured image data of the target tracking sequences in the video database.

19. The video abstract generation apparatus according to claim 18, wherein the performing code further causes at least one of the at least one processor to:
    perform foreground extraction on an image of the video, to obtain a foreground image of each frame of the image;
    perform attribute analysis on the foreground image of the image, to obtain an attribute analysis result of the target tracking sequences in the image; and
    store the attribute analysis result in a preset structured target attribute data structure, to obtain the structured image data of the target tracking sequences.

20. A non-transitory storage medium, storing a plurality of instructions, the plurality of instructions executable by a processor to cause the processor to perform:
    obtaining a target searching condition;
    searching a video database for structured image data meeting the target searching condition, the structured image data being stored in the video database in a structured data format; and performing video synthesis on the structured image data meeting the target searching condition, to generate a video abstract, wherein the searching comprises determining selected target tracking sequences in the video database according to the target searching condition, the video database storing structured image data using a target tracking sequence as a unit, and wherein the performing the video synthesis comprises:

generating N synthesis queues, N being a positive integer, and allocating the selected target tracking sequences in the video database to the N synthesis queues; and sequentially attaching a plurality of foreground images of a corresponding target tracking sequence in the N synthesis queues to a corresponding background image, to generate the video abstract.

* * * * *